United States Patent [19]
Villarreal et al.

[11] Patent Number: 5,658,012
[45] Date of Patent: Aug. 19, 1997

[54] SEAT BELT WEBBING ENERGY MANAGEMENT DEVICE

[75] Inventors: Perfecto G. Villarreal, Reynosa, Mexico; Dennis M. Anderson, McAllen, Tex.

[73] Assignee: TRW Vehicle Safety Systems Inc., Lyndhurst, Ohio

[21] Appl. No.: 552,236

[22] Filed: Nov. 2, 1995

[51] Int. Cl.$^6$ .................................................. B60R 22/28
[52] U.S. Cl. ........................................... 280/805; 297/472
[58] Field of Search .............................. 280/805; 297/470, 297/471, 472; 188/376

[56] References Cited

U.S. PATENT DOCUMENTS

| | | | |
|---|---|---|---|
| 3,749,205 | 7/1973 | Fletcher et al. | 297/472 X |
| 3,891,272 | 6/1975 | Takada | 280/805 |
| 3,973,650 | 8/1976 | Nagazumi | 188/371 |
| 4,138,157 | 2/1979 | Pickett et al. | 297/472 |
| 4,515,254 | 5/1985 | Markov et al. | 280/805 X |
| 4,588,208 | 5/1986 | Yoshitsugu | 280/805 |
| 5,529,343 | 6/1996 | Klink | 280/805 |

FOREIGN PATENT DOCUMENTS 2228981   12/1974   France ................................. 297/472

*Primary Examiner*—Christopher P. Ellis
*Attorney, Agent, or Firm*—Tarolli, Sundheim, Covell, Tummino & Szabo

[57] ABSTRACT

A vehicle seat belt system (11) includes a length of belt webbing (60) for restraining a vehicle occupant. The belt webbing (60) has a shortened condition and an extended condition. An elongate tear strip (50), preferably made from seat belt webbing material, is connected between first and second sections (120, 122) of the belt webbing (60). The tear strip (50) is tearable lengthwise upon the application of a force greater than a predetermined force to the belt webbing (60) to enable the first and second sections (120, 122) of the belt webbing to separate and cause the seat belt webbing to extend from the shortened condition to the extended condition. The tear strip (50) tears over a period of time, reducing the abruptness of the load on the vehicle occupant during a vehicle collision.

16 Claims, 3 Drawing Sheets

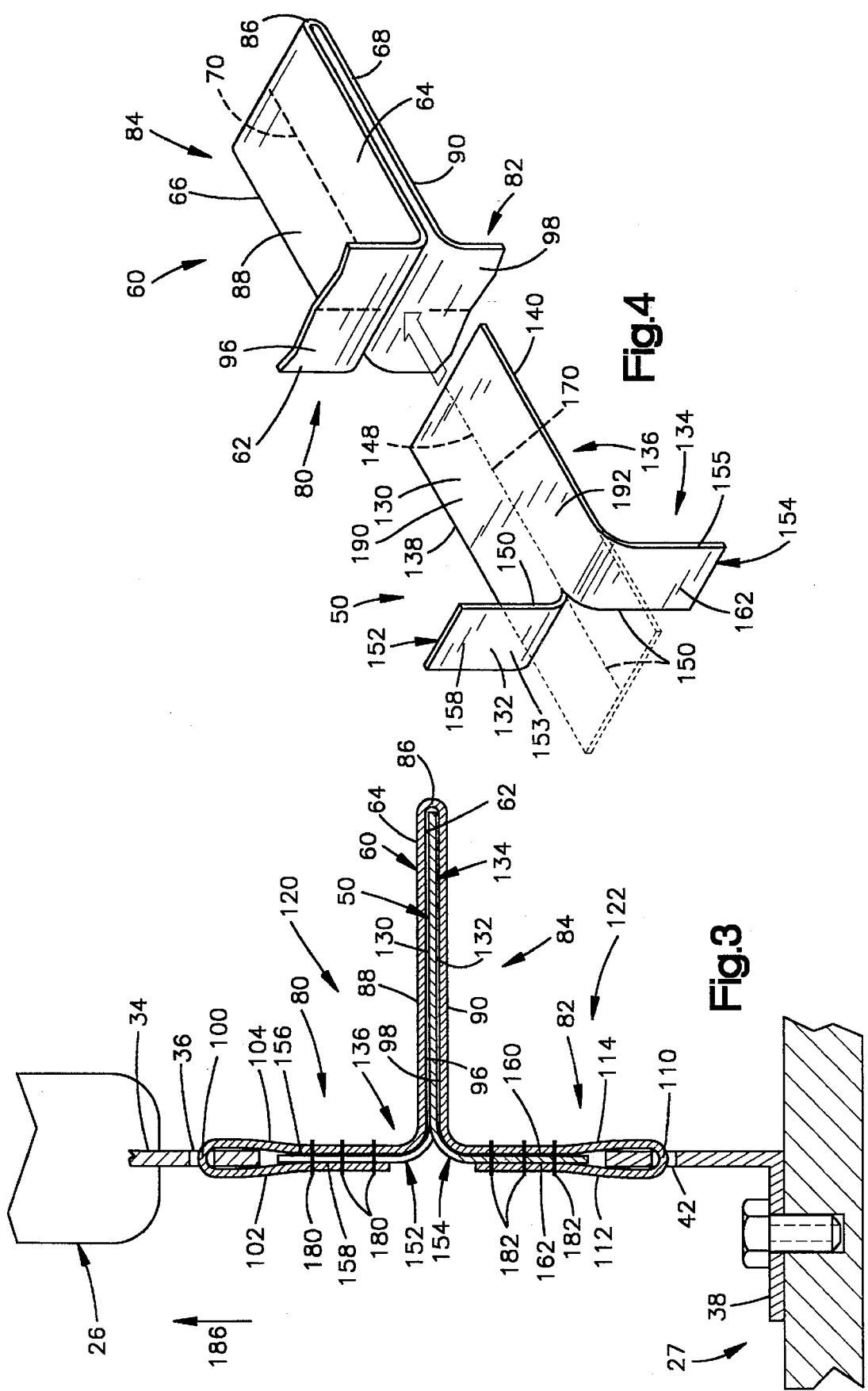

SEAT BELT WEBBING ENERGY MANAGEMENT DEVICE

BACKGROUND OF THE INVENTION

1. Technical Field

The present invention relates to a vehicle occupant restraint system. In particular, the present invention relates to an energy management device for seat belt webbing used in a seat belt system.

2. Description of the Prior Art

Seat belt systems are commonly used to restrain vehicle occupants. A typical seat belt system for restraining a vehicle occupant includes a length of belt webbing extensible about the occupant and having opposite ends anchored to the vehicle. In the event of sudden deceleration such as occurs in a vehicle collision, the occupant tends to move forward relative to the vehicle and is restrained by the belt webbing.

The vehicle occupant can experience a sudden load if the occupant's forward movement is restrained by an inextensible length of belt webbing. To alleviate this sudden load, it is known to stitch together portions of the belt webbing with a series of spaced apart tear stitches to shorten the belt webbing. When the occupant engages the belt webbing with sufficient force, the load on the belt webbing tears the stitching. The belt webbing portions separate and the belt webbing extends slightly. The occupant's movement is restrained at a reduced rate over an increased period of time. This can reduce the abruptness of the load experienced by the vehicle occupant.

As each one of the tear stitches tears, the load on the occupant changes abruptly. Further, each one of a series of tear stitches can tear with a different amount of resistance than other ones of the series of tear stitches. As a result, energy management characteristics of a seat belt system including tear stitches can be uneven.

SUMMARY OF THE INVENTION

The present invention is a vehicle safety apparatus comprising a belt webbing for restraining a vehicle occupant. The belt webbing has a shortened condition and an extended condition. An elongate strip is connected between first and second sections of the belt webbing. The strip is tearable lengthwise upon the application of a force greater than a predetermined force to the belt webbing to allow the first and second sections of the belt webbing to separate and extend from the shortened condition to the extended condition. The tearing of the strip causes the belt webbing to restrain the occupant's movement over an increased period of time.

BRIEF DESCRIPTION OF THE DRAWINGS

Further features of the present invention will become apparent to those skilled in the art to which the present invention relates from reading the following specification with reference to the accompanying drawings, in which:

FIG. 3 is a longitudinal sectional view of the energy management device of FIG. 2;

FIG. 4 is an exploded perspective view of parts of the energy management device of FIG. 2;

DESCRIPTION OF PREFERRED EMBODIMENT

Figure 1:
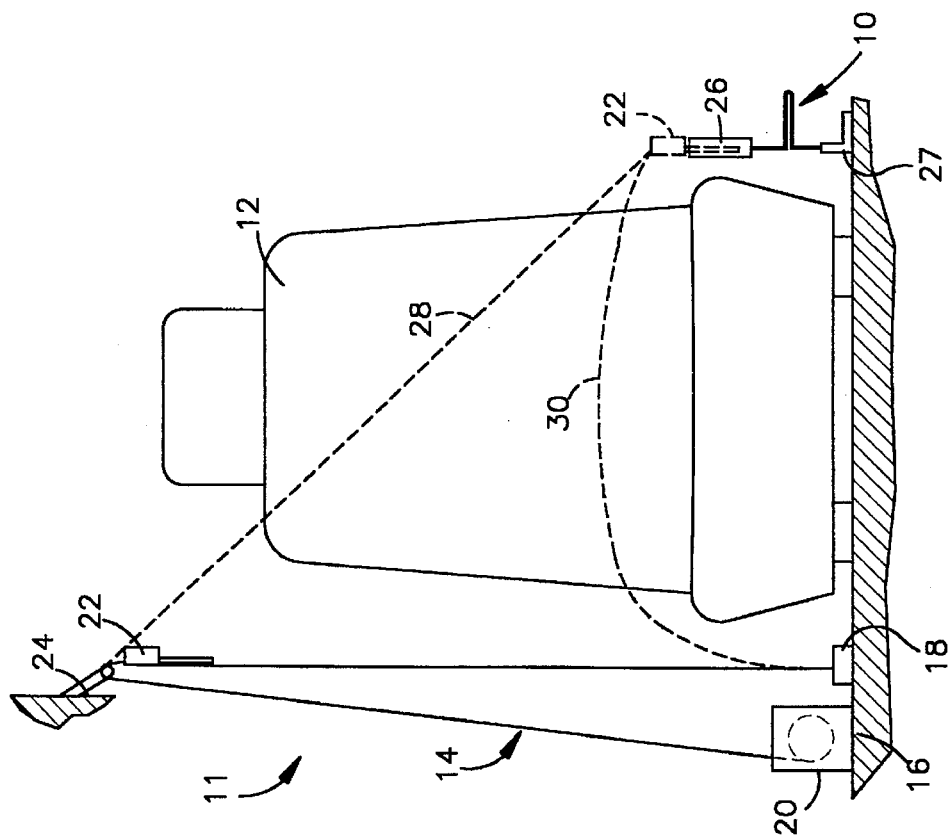
FIG. 1 is a schematic illustration of a vehicle seat belt system including a seat belt webbing energy management device which is constructed in accordance with the present invention and which includes a length of belt webbing for restraining a vehicle occupant.

The present invention relates to a vehicle occupant restraint, and in particular, to an energy management device for seat belt webbing in a vehicle occupant restraint system. As representative of the present invention, FIG. 1 illustrates an energy management device 10. The energy management device 10 is incorporated in a three-point continuous loop seat belt system 11 for use in restraining an occupant of a vehicle.

During operation of the vehicle, an occupant of the vehicle sits on a seat 12 which is illustrated as a front passenger seat in the vehicle. A length of belt webbing 14 is extensible about the vehicle occupant. One end of the length of belt webbing 14 is anchored to the vehicle body 16 at an anchor point 18. The opposite end of the belt webbing 14 is attached to a retractor 20 secured to the vehicle body. Intermediate its ends, the belt webbing 14 passes through a tongue assembly 22 and a D-ring 24. When the seat belt system 11 is not in use, the belt webbing 14 is wound on the retractor 20 and is oriented generally vertically on one side of the seat 12, as shown in solid lines in FIG. 1.

To engage the seat belt system 11, the tongue assembly 22 is manually grasped and is pulled across the lap and torso of the occupant sitting in the seat 12. As the tongue assembly 22 is pulled across the lap and torso of the occupant, the tongue assembly moves along the belt webbing 14, and the belt webbing is unwound from the retractor 20. When the belt webbing 14 has been pulled across the lap and torso of the occupant, the tongue assembly 22 is connected with a buckle 26, as shown in dashed lines in FIG. 1. The buckle 26 is connected to the vehicle body 16 by an anchor assembly 27 and is disposed on the side of the seat 12 opposite the anchor point 18 and the retractor 20. When the seat belt system 11 is thus buckled, the length of belt webbing 14 is divided by the tongue assembly 22 into a torso portion 28 which extends across the torso of the occupant and a lap portion 30 which extends across the lap of the occupant.

A buckle such as the buckle 26 in a seat belt system such as the seat belt system 11 is typically connected to the vehicle body by an inextensible cable or length of belt webbing. In accordance with the present invention, the energy management device 10 (FIG. 1) is located in the seat belt system 11 in a force-transmitting relationship between the buckle 26 and the anchor assembly 27.

The energy management device 10 (FIGS. 2–4) includes a tear strip 50 and a length of belt webbing 60. The length of belt webbing 60 is a single continuous length of seat belt webbing material, preferably made of woven polyester, and can be made from the same material as the belt webbing 14. The length of belt webbing 60 has first and second opposite major side surfaces 62 and 64. The belt webbing 60 also has first and second opposite, longitudinally extending edge portions 66 and 68. A longitudinal central axis 70 of the belt webbing 60 is disposed between and extends parallel to the edge portions 66 and 68 of the belt webbing.

The length of belt webbing 60 includes an intermediate portion 84 and first and second end portions 80 and 82 which extend perpendicular or transverse to the intermediate portion. The intermediate portion 84 of the belt webbing 60 is folded at a fold line 86 so that a first part 88 of the intermediate portion overlies a second part 90 of the intermediate portion. As a result, a first part 96 (FIG. 3) of the first major side surface 62 of the belt webbing 60, on the first part 88 of the intermediate portion 84, overlies and is adjacent to, but spaced apart from, a second part 98 of the first major side surface of the belt webbing on the second part 90 of the intermediate portion.

The first end portion 80 (FIG. 3) of the belt webbing 60 extends from the intermediate portion 84 and is secured for movement with the buckle 26. The first end portion 80 extends through an opening 36 in an anchor plate 34 of the buckle 26. The first end portion 80 is folded at a fold line 100 so that a part 102 of the first end portion of the belt webbing overlies another part 104 of the first end portion. The parts 102 and 104 of the first end portion 80 of the belt webbing 60 are sewn together in a manner described below.

The second end portion 82 (FIG. 3) of the belt webbing 60 extends from the intermediate portion 84 in a direction opposite to the first end portion 80. The second end portion 82 of the belt webbing 60 extends through an opening 42 in an anchor plate 38 of the anchor assembly 27. The second end portion 82 of the belt webbing 60 is folded at a fold line 110 so that a part 112 of the second end portion of the belt webbing overlies another part 114 of the second end portion. The parts 112 and 114 of the second end portion 82 of the belt webbing 60 are sewn together, in a manner described below, to secure the second end portion of the belt webbing to the vehicle body 16.

The fold line 86 in the intermediate portion 84 of the length of belt webbing 60 defines two sections 120 and 122 of the belt webbing. The first section 120 of the belt webbing 60 includes the first part 88 of the intermediate portion 84 and the first end portion 80 of the belt webbing. The second section 122 of the belt webbing 60 includes the second part 90 of the intermediate portion 84 and the second end portion 82 of the belt webbing.

The tear strip 50 (FIG. 4) has first and second opposite major side surfaces 130 and 132 and first and second end portions 134 and 136. Longitudinal edge portions 138 and 140 of the tear strip 50 extend parallel to a longitudinal central axis 148 of the tear strip 50. The axis 148 of the tear strip 50 extends parallel to the axis 70 of the belt webbing 60.

The tear strip 50 (FIGS. 2–4) is a single layer of fabric material, preferably seat belt webbing material. Typical seat belt webbing is made from woven yarns of polyester. The seat belt webbing includes a plurality of warp yarns which run the length of the webbing. The warp yarns bear the tensile load which is placed on the webbing by the vehicle occupant. Each one of the warp yarns includes a plurality of extruded polyester filaments which are twisted together to form the warp yarn. The seat belt webbing also includes weft yarns which run across the warp, tying the webbing together. Each one of the weft yarns includes a plurality of extruded polyester filaments which are twisted together to form the weft yarn.

A typical seat belt webbing material is made from 264 warp yarns which run the length of the belt webbing, and from 15 to 20, and preferably 16, weft yarns per inch (lengthwise) of belt webbing. The seat belt webbing has a width in the range of from about 45 mm to about 50 mm. Each warp yarn is 840 denier (that is, weighs 840 grams per 9,000 meters of yarn) and is made from 74 filaments. Each weft yarn is 500 denier (that is, weighs 500 grams per 9,000 meters of yarn). Each one of the 16 weft yarns per inch (lengthwise) of belt webbing is doubled back across the width of the belt webbing so that there are actually 32 lengths or occurrences of weft yarn in each inch (lengthwise) of belt webbing. Because of vehicle safety requirements and standards, each length of seat belt webbing is woven to exacting standards in a uniform and consistent manner along its length.

The material of the tear strip 50 is, during manufacture of the energy management device 10, cut or otherwise separated along a cut line 150 in the first end portion 134 of the tear strip. The cut line 150 extends along a portion of the axis 148 of the tear strip through the first end portion 134 of the tear strip 50. The cut line 150 is collinear with an imaginary tear line 170. The tear line 170 extends as an extension of the cut line 150, through the second end portion 136 of the strip 50 in a direction parallel to and along the axis 148. The material of the tear strip 50 is not torn or cut along the tear line 170 during manufacture of the energy management device 10. In one embodiment, the cut line 150 has a length of 50 mm while the tear strip 50 has a length of 150 mm.

The cut line 150 and the tear line 170 divide the tear strip 50 into a first segment 152 and a second segment 154. The first segment 152 of the tear strip 50 includes two parts designated 153 and 190 which are disposed on the side of the cut line 150 and the tear line 170 which is generally to the left as viewed in FIG. 4. The second segment 154 of the tear strip 50 includes two parts designated 155 and 192 which are disposed on the opposite side of the cut line 150 and the tear line 170 (generally to the right as viewed in FIG. 4).

The first segment 152 of the tear strip 50 has a first major side surface 156 (FIG. 3) which is a portion of the first major side surface 130 of the tear strip 50. The first segment 152 also has a second major side surface 158, which is a portion of the second major side surface 132 of the tear strip 50. The second segment 154 of the tear strip 50 has a first major side surface 160 which is a portion of the first major side surface 130 of the tear strip 50. The second segment 154 also has a second major side surface 162, which is a portion of the second major side surface 132 of the tear strip 50.

Figure 2:
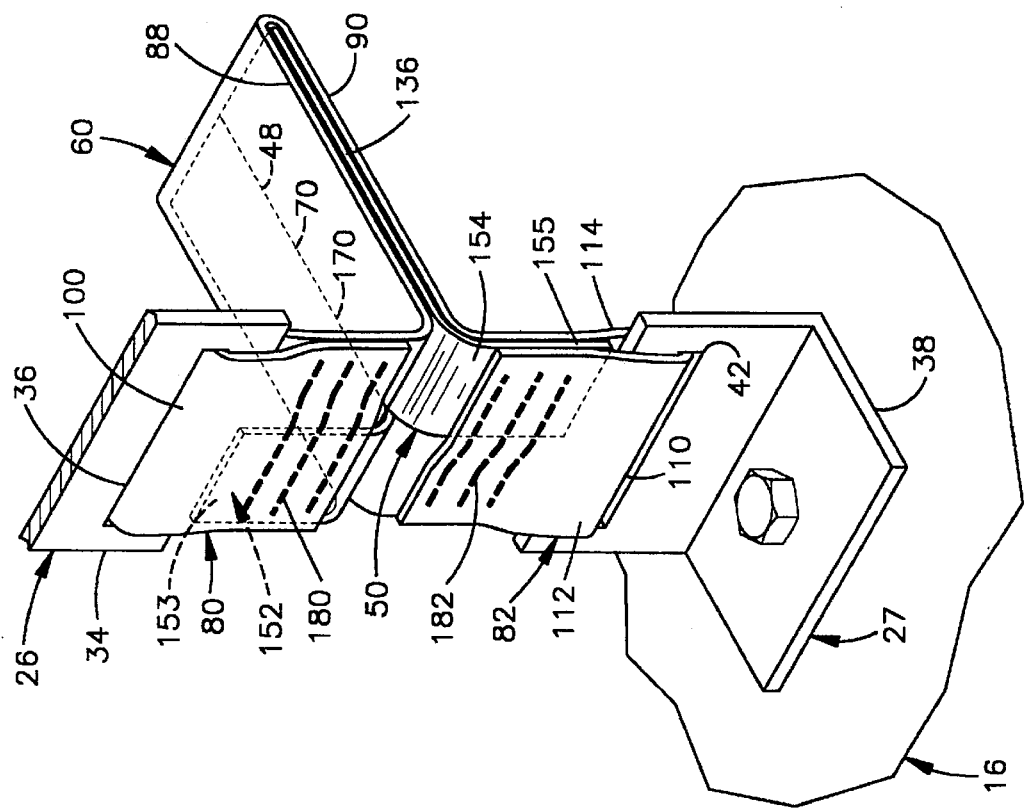
FIG. 2 is a perspective view of the energy management device of FIG. 1 showing the belt webbing in a shortened condition.

The energy management device 10 is illustrated in FIGS. 1–3 in a shortened condition. A portion of the tear strip 50 is disposed between the first and second parts 88 and 90 of the belt webbing 60. Specifically, the second end portion 136 of the tear strip 50, including the parts 190 and 192 of the first and second segments 152 and 154, respectively, is disposed between the first and second parts 88 and 90 of the intermediate portion 84 of the belt webbing 60. The first and second parts 88 and 90 of the intermediate portion 84 of the belt webbing 60, and the second end portion 136 of the tear strip 50, are disposed in an overlying relationship and are in abutting engagement with each other, but are unstitched to each other. The length of belt webbing 60 normally remains in the shortened condition shown in FIGS. 2–4 because it is sewn to the tear strip 50 in a manner described below.

The first major side surface 62 of the belt webbing 60 overlies and is adjacent to the first part 96 of the first major side surface 130 of the tear strip 50. The second major side surface 132 of the tear strip 50 overlies and is adjacent to the second part 98 of the first major side surface 62 of the belt webbing 60.

The first end portion 134 of the tear strip 50 extends transverse to the second end portion 136 of the tear strip. The part 153 of the first segment 152 of the tear strip 50 is disposed between and extends parallel to the two parts 102 and 104 of the first end portion 80 of the belt webbing 60.

A series of stitching lines or stitching sections 180 secures the part 153 of the first segment 152 of the tear strip 50 to the first end portion 80 of the belt webbing 60. The stitching sections 180 are not tear stitches, that is, are not designed to release in the event of sudden vehicle deceleration such as occurs in a vehicle collision. The first segment 152 of the tear strip 50 is thus secured for movement with the first section 120 of the belt webbing 60 and, thereby, with the buckle 26.

The part 155 of the second segment 154 of the tear strip 50 extends generally parallel to, and in an opposite direction from, the part 153 of the first segment 152. The part 153 of the tear strip 50 is disposed between and extends parallel to the two parts 112 and 114 of the second end portion 82 of the belt webbing 60. A series of stitching lines or stitching sections 182 secures the part 155 of the second segment 154 of the tear strip 50 to the second end portion 82 of the belt webbing 60. The stitching sections 182, like the stitching sections 180, are not tear stitches. The second segment 154 of the tear strip 50 is thus fixed to the second section 122 of the belt webbing 60 and, thereby, to the anchor assembly 27 and the vehicle body 16.

When the energy management device 10 is in the shortened condition illustrated in FIGS. 2 and 3, the second end portion 136 of the tear strip 50 is connected in a force-transmitting relationship, through the segments 152 and 154 of the tear strip, between the buckle 26 and the anchor assembly 27. The second end portion 136 of the tear strip 50 is not torn or cut. The material of the second end portion 136 of the tear strip 50 resists tearing and resists extension of the cut line 150. The tear strip 50 thereby resists movement of the first end portion 80 of the belt webbing 60 away from the second end portion 82, that is, in an upward direction as indicated by the arrow 186 in FIGS. 3 and 5–6. As a result, the tear strip 50 resists movement of the buckle 26 away from the anchor assembly 27. The length of belt webbing 60, therefore, remains in the shortened condition shown in FIGS. 2–4.

The buckle 26 does not move away from the anchor assembly 27 unless a tensile force greater than a predetermined force is applied to the first and second end portions 80 and 82 of the belt webbing 60. The predetermined force is selected to be a force which is not experienced during use of the vehicle safety system 11 other than in a vehicle collision. Thus, the parts of the energy management device 10, including the belt webbing 60 and the tear strip 50, are normally in the position shown in FIGS. 2 and 3 in which the belt webbing 60 is in the shortened condition and the second end portion 136 of the tear strip is not torn.

In the event of sudden deceleration such as occurs in a vehicle collision, the vehicle occupant moves forward in the vehicle relative to the vehicle body 16 and applies force against the belt webbing 14. The kinetic energy of the forward moving vehicle occupant is transmitted through the belt webbing 14 and the buckle 26 into the energy management device 10 and, specifically, into the length of belt webbing 60. A tensile force greater than the predetermined force may be applied to the end portions 80 and 82 of the belt webbing 60.

The resistance to tearing of the tear strip 50 is not sufficient to maintain the belt webbing 60 in the shortened condition shown in FIGS. 2 and 3 if the force applied to the belt webbing 60 is above the predetermined force. In such an event, the material of the tear strip 50 tears along the tear line 170, from the cut line 150, into and through the second end portion 136 of the tear strip.

When the tear strip 50 tears, the weft yarns which run across the width of the tear strip tear sequentially one after the other, absorbing energy applied to the tear strip through the belt webbing 60. Because the weft yarns are sewn in the tear strip 50 in a uniform and consistent manner along the length of the tear strip, the tear strip resists tearing, and subsequently does tear, in an even, consistent manner along its entire length.

When the tear strip 50 tears, the first segment 152 of the tear strip separates from the second segment 154 of the tear strip. The first section 120 of the belt webbing 60 separates from the second section 122 of the belt webbing. The first segment 152 of the tear strip 50 moves with the first section 120 of the belt webbing 60 and the buckle 26 moves upward as viewed in FIGS. 2–3 and 5–6. The second segment 154 of the tear strip 50 remains connected with the second section 122 of the belt webbing 60 and thus remains fixed to the vehicle body 16 through the anchor assembly 27.

Figures 5, 6:
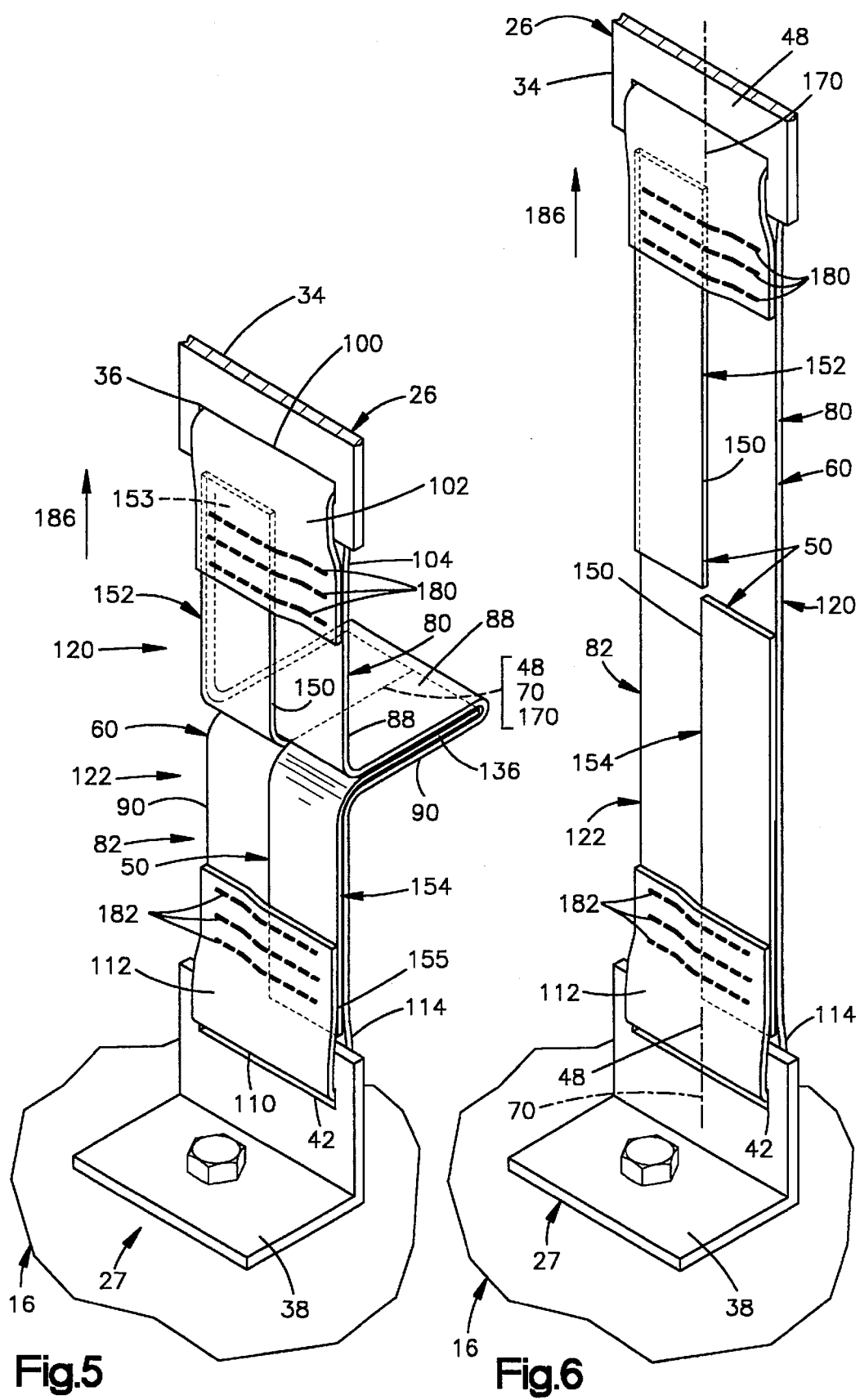
FIG. 5 is a view similar to FIG. 2 showing the belt webbing in a partially extended condition.
FIG. 6 is a view similar to FIG. 5 showing the belt webbing in a fully extended condition.

As the tear strip 50 tears over a period of time, the belt webbing 60 extends and moves over that period of time from the shortened condition shown in FIGS. 2 and 3, through a partially extended condition shown in FIG. 5, to a fully extended condition as shown in FIG. 6 in which the belt webbing 60 is straight and unfolded. During this extension process, the tear strip 50, as it tears along the tear line 170, resists but does not block relative movement between the first section 120 and the second section 122 of the belt webbing 60. Once the tear strip 50 is completely torn and the length of belt webbing 60 is completely extended, as illustrated in FIG. 6, tensile force is transmitted substantially undiminished, through only the belt webbing 60, between the end portions 80 and 82 of the belt webbing.

The extending of the belt webbing 60 is not instantaneous but instead occurs over a period of time, because the resistance to tearing of the tear strip 50 retards the lengthening of the belt webbing. During this time period, the seat belt system 11 does not fully block forward movement of the vehicle occupant. The occupant's forward movement does not cease until the length of belt webbing 60 is completely extended, or until the force exerted by the occupant decreases to an amount below that needed to continue tearing the material of the tear strip 50.

Therefore, it can be seen that, in an event such as a vehicle collision, occupant deceleration resulting from engagement with the seat belt system 11 occurs over a longer period of time, as compared to occupant deceleration resulting from engagement with an inextensible length of belt webbing. This reduces the abruptness of the load on the vehicle occupant during a vehicle collision. All the kinetic energy of the moving vehicle occupant is transferred to the belt webbing 14 of the seat belt system 11, but over a longer time period. Transferring the same amount of kinetic energy to the belt webbing 14 over a longer period of time, results in the lower rate of occupant deceleration. The energy management device 10 thus helps to manage and to control the kinetic energy of the moving vehicle occupant resulting from the sudden vehicle deceleration.

Because the material of the tear strip 50 tears in a smooth, even, predictable manner, the energy management device 10 provides consistent and desirable energy management characteristics for the seat belt system 11. The rate of tearing of the tear strip 50 controls the period of time which is needed to move the belt webbing 60 from the shortened condition to the extended condition. Different materials, or different thicknesses of belt webbing, can be used to provide different amounts of resistance to tearing. Thus, by varying the rate of tearing, or resistance to tearing, of the tear strip 50, the characteristics of the energy management device 10 can be controlled as desired.

From the above description of the invention, those skilled in the art will perceive improvements, changes and modifications in the invention. For example, an energy management device in accordance with the present invention may be incorporated in a seat belt system at a location other than between the buckle and the vehicle body. Also, the tear strip can be made from a material other than seat belt webbing. Such improvements, changes and modifications within the skill of the art are intended to be covered by the appended claims.

Having described the invention, we claim:

1. A vehicle safety apparatus comprising:
   a belt webbing for restraining a vehicle occupant, said belt webbing having a shortened condition and an extended condition; and
   an elongate strip connected between first and second sections of said belt webbing;
   said strip being tearable lengthwise upon the application of a force greater than a predetermined force to said belt webbing to separate said first and second sections of said belt webbing and extend said belt webbing from the shortened condition to the extended condition;
   said elongate strip comprising a single layer of material which is at least partially disposed between sections of said belt webbing which engage opposite sides of said single layer of material when said webbing is in the shortened condition.

2. A vehicle safety apparatus comprising:
   a belt webbing for restraining a vehicle occupant, said belt webbing having a shortened condition and an extended condition; and
   an elongate strip connected between first and second sections of said belt webbing;
   said strip being tearable lengthwise upon the application of a force greater than a predetermined force to said belt webbing to separate said first and second sections of said belt webbing and extend said belt webbing from the shortened condition to the extended condition;
   said belt webbing and said elongate strip having parallel longitudinal axes when said belt webbing is in the shortened condition, said elongate strip having a tear line which extends parallel to said longitudinal axis of said elongate strip.

3. A vehicle safety apparatus comprising:
   a belt webbing for restraining a vehicle occupant, said belt webbing having a shortened condition and an extended condition; and
   an elongate strip connected between first and second sections of said belt webbing;
   said strip being tearable lengthwise upon the application of a force greater than a predetermined force to said belt webbing to separate said first and second sections of said belt webbing and extend said belt webbing from the shortened condition to the extended condition;
   said elongate strip comprising a length of fabric material having first and second end portions, said first end portion being divided by a cut line into a first segment which is connected for movement with said first section of said belt webbing and a second segment which is connected for movement with said second section of said belt webbing, said length of fabric material being tearable along a tear line which extends from said cut line in a direction from said first end portion and into said second end portion of said length of fabric material.

4. An apparatus as set forth in claim 3 wherein said first segment of said first end portion of said length of fabric material is sewn to said first section of belt webbing, said second segment of said first end portion of said length of fabric material being sewn to said second section of belt webbing, said length of fabric material comprising a length of belt webbing.

5. A vehicle safety apparatus comprising:
   an elongate belt webbing for restraining a vehicle occupant, said belt webbing having a shortened condition and an extended condition, said belt webbing having first and second sections which are spaced apart longitudinally from each other when said belt webbing is in the shortened condition; and
   a tearable strip connected between said first and second sections of said belt webbing for controlling movement of said belt webbing from the shortened condition to the extended condition;
   said tearable strip having a first end portion a first part of which is connected for movement with said first section of said belt webbing and a second part of which is connected for movement with said second section of said belt webbing;
   said tearable strip being tearable longitudinally in response to the application of a tensile force greater than a predetermined force to said first and second sections of said belt webbing to enable movement of said belt webbing from the shortened condition to the extended condition;
   said first end portion of said tearable strip being divided longitudinally between said first and second parts, said tearable strip having a second end portion which is connected with said first end portion and which resists separation of said first part of said first end portion from said second part of said first end portion.

6. An apparatus as set forth in claim 5 wherein said tearable strip has a longitudinal axis and said second end portion of said tearable strip is tearable along a tear line which extends parallel to said longitudinal axis.

7. A vehicle safety apparatus comprising:
   an elongate belt webbing for restraining a vehicle occupant, said belt webbing having a shortened condition and an extended condition, said belt webbing having first and second sections which are spaced apart longitudinally from each other when said belt webbing is in the shortened condition; and
   a tearable strip connected between said first and second sections of said belt webbing for controlling movement of said belt webbing from the shortened condition to the extended condition;
   said tearable strip having a first end portion a first part of which is connected for movement with said first section of said belt webbing and a second part of which is connected for movement with said second section of said belt webbing;
   said tearable strip being tearable longitudinally in response to the application of a tensile force greater than a predetermined force to said first and second sections of said belt webbing to enable movement of said belt webbing from the shortened condition to the extended condition;
   said tearable strip comprising a length of woven fabric material, a first end portion of said length of woven fabric material being separated longitudinally to form said first and second parts of said first end portion of said tearable strip, a second end portion of said length of woven fabric material being tearable longitudinally along a tear line to enable movement of said first part away from said second part to enable movement of said belt webbing from the shortened condition to the extended condition.

8. A vehicle safety apparatus comprising:

a belt webbing for restraining a vehicle occupant, said belt webbing having a shortened condition and an extended condition;

an elongate strip;

first means connecting a first segment of said strip to a first section of said belt webbing; and second means connecting a second segment of said strip to a second section of said belt webbing;

said first and second segments of said strip being offset laterally from each other;

said strip having a tearable portion between said first and second segments which is tearable lengthwise upon the application of a force greater than a predetermined force to said belt webbing to separate said first and second sections of said belt webbing and extend said belt webbing from the shortened condition to the extended condition.

9. An apparatus as set forth in claim 8 wherein said tearable portion of said elongate strip tears along a tear line extending through said tearable portion to separate said first segment of said elongate strip from said second segment of said elongate strip.

10. An apparatus as set forth in claim 8 wherein said first and second sections of said belt webbing extend in opposite directions from said tearable portion of said elongate strip when said belt webbing is in the shortened condition, said tearable portion of said elongate strip tearing upon pulling of said first and second sections of said belt webbing in said opposite directions to move said segments of said elongate strip in said opposite directions.

11. An apparatus as set forth in claim 8 wherein said elongate strip comprises a single layer of material which is at least partially disposed between folded portions of said belt webbing.

12. An apparatus as set forth in claim 8 wherein said belt webbing has first and second major side surfaces, said first major side surface of said belt webbing being disposed in engagement with opposite side surfaces of said elongate strip when said webbing is in the shortened condition.

13. An apparatus as set forth in claim 8 wherein said belt webbing has longitudinally extending edge portions, said tearable portion of said elongate strip being tearable at a location between said longitudinally extending edge portions of said belt webbing upon movement of said belt webbing from the shortened condition to the extended condition.

14. An apparatus as set forth in claim 8 wherein said elongate strip has longitudinally extending edge portions and said tearable portion of said elongate strip is tearable at a location between said longitudinally extending edge portions of said elongate strip upon movement of said belt webbing from the shortened condition to the extended condition.

15. An apparatus as set forth in claim 8 wherein said tearable strip comprises a length of woven fabric material having in the range of from about 15 weft yarns per inch to about 20 weft yarns per inch.

16. An apparatus as set forth in claim 8 wherein said laterally offset first and second segments of said elongate strip extend in opposite directions from said tearable portion of said elongate strip when said belt webbing is in the shortened condition, said tearable portion tearing along a tear line which separates said tearable portion into laterally offset first and second torn parts upon the pulling of said first and second sections of said belt webbing in said opposite directions, said first and second torn parts extending integrally from said first and second segments, respectively.

* * * * *